United States Patent
Kee

(10) Patent No.: US 7,053,891 B2
(45) Date of Patent: May 30, 2006

(54) LCD WITH POWER CONVERSION CAPABILITY

(75) Inventor: Yew-Peng Kee, Taipei (TW)

(73) Assignee: Lite-On Technology Corp., Taipei (TW)

( * ) Notice: Subject to any disclaimer, the term of this patent is extended or adjusted under 35 U.S.C. 154(b) by 156 days.

(21) Appl. No.: 10/298,986

(22) Filed: Nov. 18, 2002

(65) Prior Publication Data

US 2003/0107540 A1 Jun. 12, 2003

(30) Foreign Application Priority Data

Dec. 21, 2001 (TW) .............................. 90222567 U

(51) Int. Cl.
*G09G 5/00* (2006.01)
(52) U.S. Cl. .......................... 345/211; 345/95; 345/210
(58) Field of Classification Search ............ 345/87–96, 345/204, 210–215; 363/17–55, 130–133; 307/64–87
See application file for complete search history.

(56) References Cited

U.S. PATENT DOCUMENTS

| 5,126,585 | A | * | 6/1992 | Boys ........................... 307/66 |
| 5,811,786 | A | * | 9/1998 | Rockstein et al. ...... 235/472.01 |
| 5,978,236 | A | * | 11/1999 | Faberman et al. ............. 363/37 |
| 6,008,630 | A | * | 12/1999 | Prasad ........................ 323/222 |
| 6,014,325 | A | * | 1/2000 | Pecore ........................ 363/126 |
| 6,126,608 | A | * | 10/2000 | Kemme et al. ............. 600/459 |
| 6,482,165 | B1 | * | 11/2002 | Patton et al. ............... 600/549 |
| 6,688,527 | B1 | * | 2/2004 | Knowles et al. ....... 235/472.01 |

FOREIGN PATENT DOCUMENTS

TW 402125 8/2000

* cited by examiner

*Primary Examiner*—Vijay Shankar
(74) *Attorney, Agent, or Firm*—Rosenberg, Klein & Lee

(57) ABSTRACT

An LCD with power conversion capability. The LCD implements a power conversion model inside to convert AC input into DC operating voltage for the LCD. The power conversion model can provide functionalities of output voltage adjustment, voltage overload protection, output short-circuited protection and optimized DC conversion efficiency, thereby achieving the desired reliability.

6 Claims, 6 Drawing Sheets

LCD WITH POWER CONVERSION CAPABILITY

BACKGROUND OF THE INVENTION

1. Field of the Invention

The invention relates to an LCD, especially to an LCD capable of power conversion without relying on an external converter.

2. Description of Related Art

FIG. 1 is a schematically rear elevation diagram of a typical LCD connected to a power converter. As shown in FIG. 1, an LCD 1a currently has to be operated with the help of an external power converter 2a to convert supplied AC input into DC output. The external power converter 2a has a power line 21a with one end connected to a supplied socket 3a to receive the supplied AC input and the other end connected to a power plug 11a of the LCD 1a to power the LCD 1a.

However, the converter 2a is implemented outside the LCD 1a. This limits operating space.

Additionally, the LCD 1a and the converter 2a are generally fabricated by different manufacturers so that when the converter 2a is fabricated to be compatible with different LCD models, the retail price for the LCD 1a complying with the converter 2a is raised, since, for compatibility, the converter manufacture generally provides multiple DC output voltages to meet different LCD requirements.

Further, when the converter 2a is out of order, the user sends the LCD 1a and the converter 2a together to the LCD manufacturer. However, in fact, the LCD manufacturer does not repair the converter 2a but transports the converter 2a to and from its manufacturer. This is not convenient and takes time. An improvement scheme for the cited drawback is thus proposed.

SUMMARY OF THE INVENTION

Accordingly, an object of the invention is to provide an LCD with power conversion capability that can work normally without an external power converter and thus conserve operating space.

Another object of the invention is to provide an LCD with power conversion capability that implements power conversion inside the LCD to eliminate the need for providing different DC outputs and simplify the power circuit design, thereby reducing the required cost.

A further object of the invention is to provide an LCD with power conversion capability to shorten the repair process as required.

A further object of the invention is to provide an LCD with power conversion capability that provides effective protection for the power circuit in the LCD to reduce the failure rate and offer better power quality for the LCD in use.

To reach the cited goals, the invention provides an LCD with power conversion capability that implements a power conversion module inside to convert AC input into DC operating voltage for the LCD. The power conversion model includes a linear filter unit, a rectification/filter unit, a power conversion unit, an output rectification/filter unit, a driving unit, a feedback unit and a power management unit.

The linear filter unit can reduce electromagnetic interference (EMI). The rectification/filter unit coupled to the linear filter unit can convert the AC input into a ripple DC voltage. The power conversion unit coupled to the rectification/filter unit can convert the ripple DC voltage into DC voltage. The output rectification/filter unit coupled to the power conversion unit can filter the DC voltage and output a desired DC voltage. The driving unit coupled to the power conversion unit can control the power conversion unit for power conversion. The feedback unit coupled to the output rectification/filter unit can sense the desired DC voltage variation. The power management unit coupled with the rectification/filter unit, the power conversion unit, the driving unit and the feedback unit can receive a start voltage from the rectification/filter unit to output a series of impulses for the driving unit and adjust the impulse width of the series based on the variation of the desired DC voltage sensed by the feedback unit.

DETAILED DESCRIPTION OF THE INVENTION

The following numbers denote the same elements throughout the description and drawings.

Figure 1:
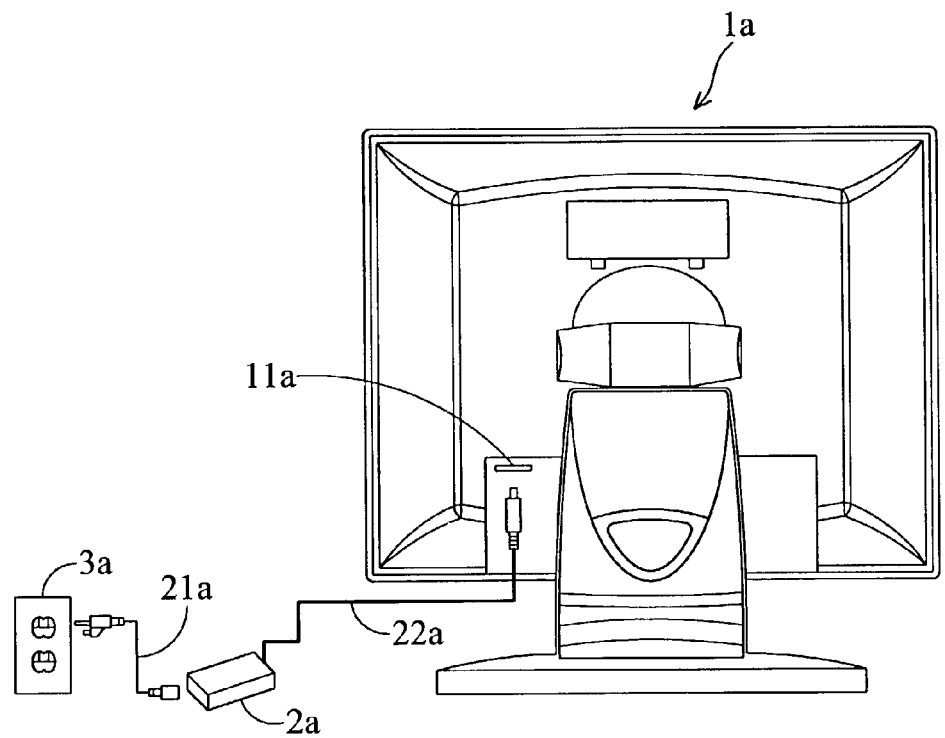
FIG. 1 is a schematic rear elevation diagram of an embodiment of a typical LCD connected to a power converter.
Figure 2:
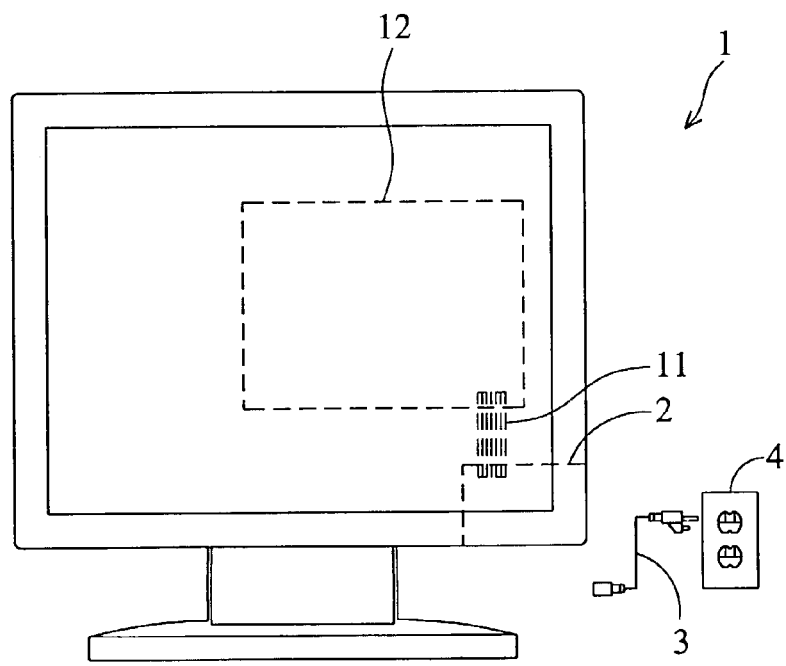
FIG. 2 is a schematic elevation diagram of a first embodiment according to the invention.

FIG. 2 is a schematic elevation diagram of a first embodiment according to the invention. As shown in FIG. 2 is a schematic elevation diagram of a first embodiment according to the invention. As shown in FIG. 2, this embodiment is an LCD 1 with power conversion capability that implements a power conversion module 2 inside to essentially convert an input AC voltage into a stable output DC voltage. The input AC voltage is provided by a power line 3 plugging in a power socket 4. The output DC voltage is provided by a powering bus 11 coupled to a main board 12 in the LCD 1. The main board 12 is responsive of the LCD 1 display and other functions and supplies the required operating voltage through the power conversion module 2.

Figure 3:
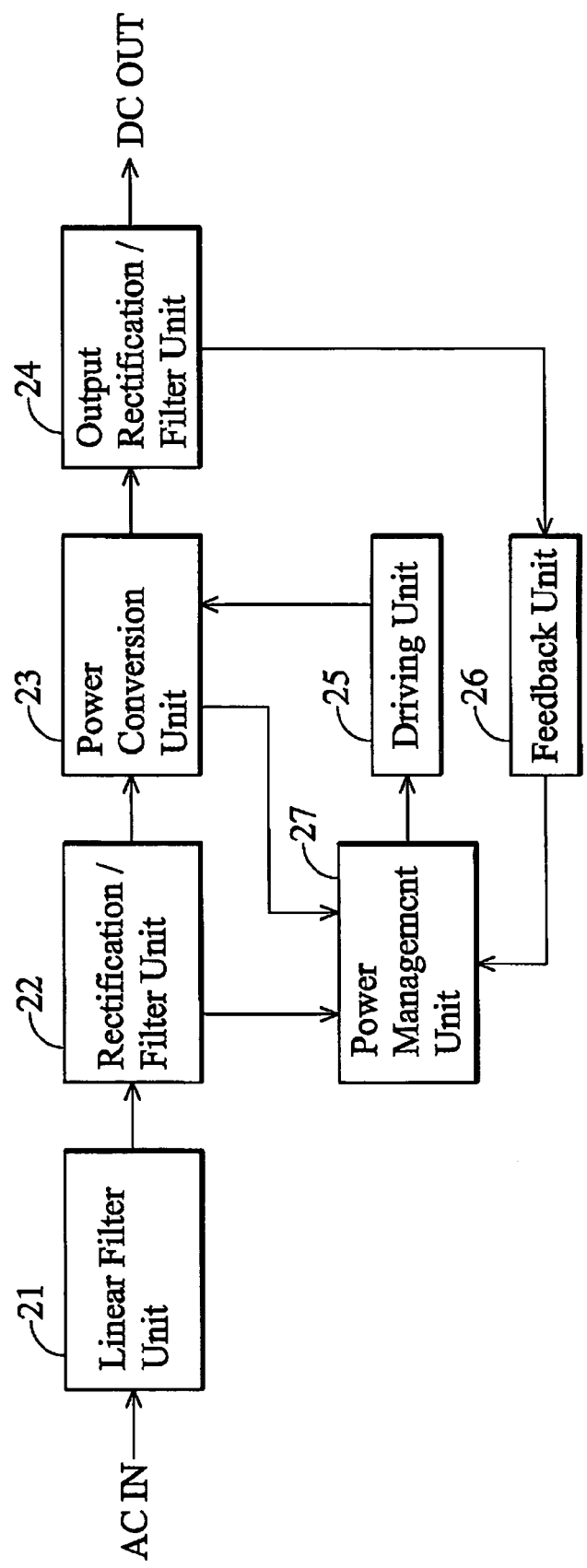
FIG. 3 is a block diagram of a power conversion module.
Figure 4A:
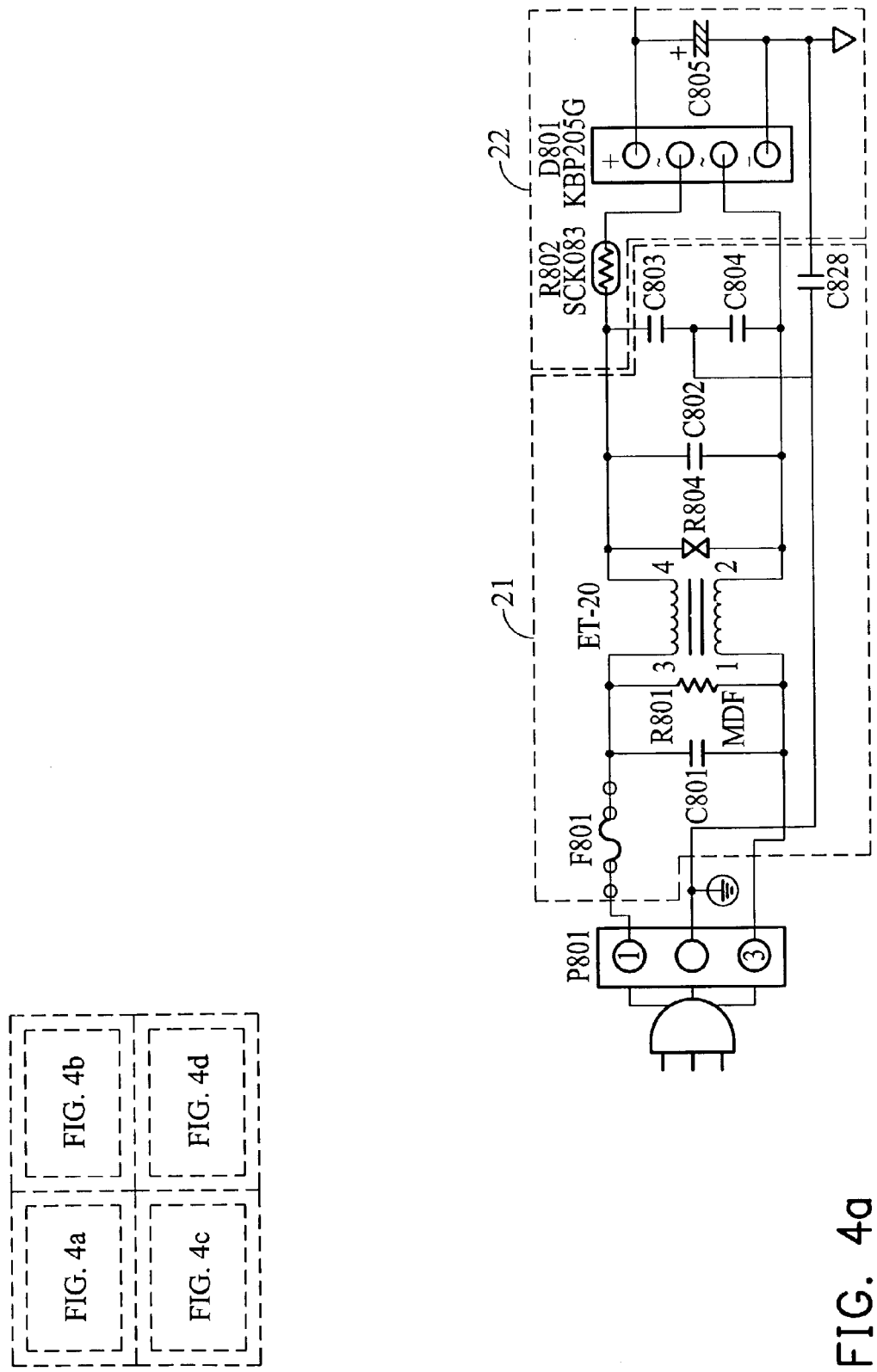
FIG. 4 is a diagram of the power conversion module circuitry of FIG. 3 according to the invention.
Figure 4B:
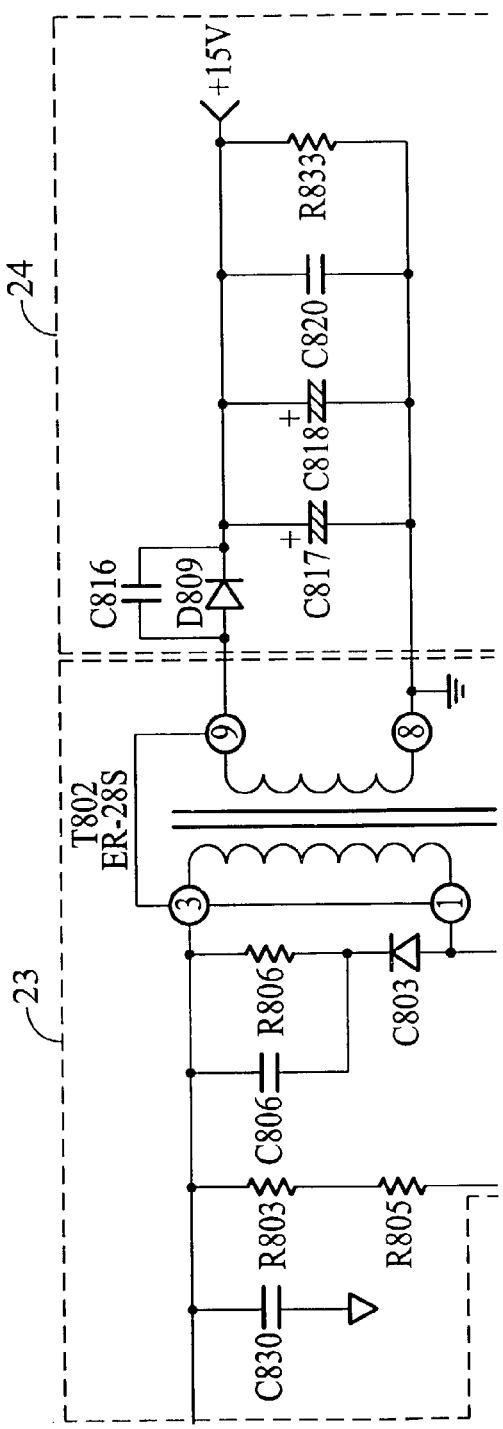
Figure 4C:
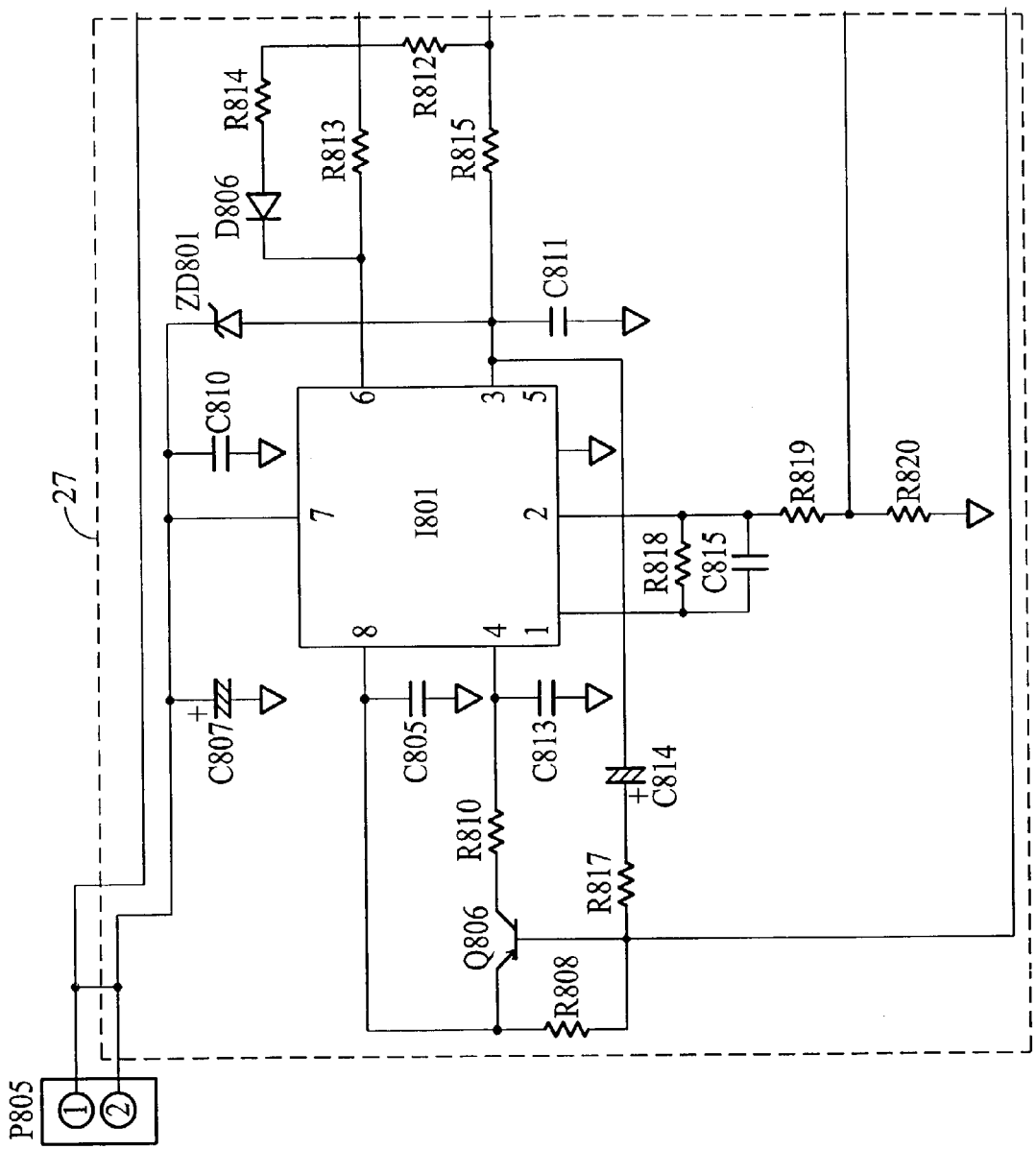
Figure 4D:
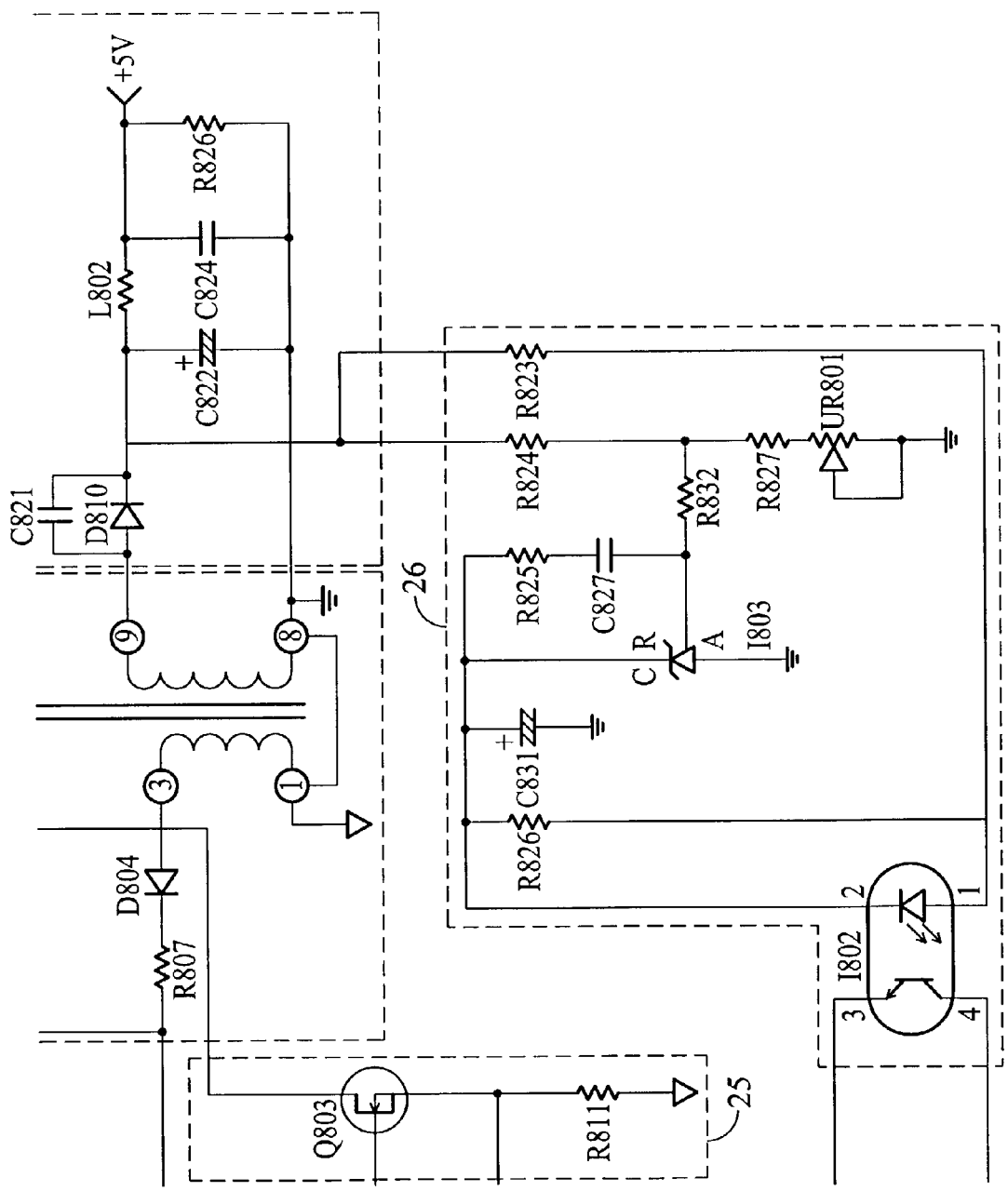

FIGS. 3 and 4 are diagrams of a power conversion module and its circuitry according to an exemplary embodiment of the invention. As shown in FIG. 3, the power conversion module 2 includes a linear filter unit 21, a rectification/filter unit 22, a power conversion unit 23, an output rectification/filter unit 24, a driving unit 25, a feedback unit 26 and a power management unit 27.

The linear filter unit 21 has an input terminal to receive the AC input and can reduce the electromagnetic interference (EMI) of a high-frequency operation. As shown in FIG. 4, the linear filter unit 21 can comprise a transformer T801, capacitors C801, C802, C803, C804 and the like.

The rectification/filter unit 22 is coupled to the linear filter unit to convert the AC input into a ripple DC voltage. As shown in FIG. 4, the rectification/filter unit 22 can comprise a resistor R802, a bridge rectifier D801 and a capacitor C805. The resistor R802 is a negative coefficient resistor that prevents an unsafe current condition arising from the great transient input current that occurs during device connection, thus avoiding device damage.

The power conversion unit 23 is coupled to the rectification/filter unit 22 to convert the ripple DC voltage into DC voltages of 15V and 5V to the main board 12 in use so that, with two fixed voltages only, the entire cost of design and manufacture is reduced. Additionally, 15V can be reduced to 12V as desired. As shown in FIG. 4, the power conversion unit 23 comprises resistors R803, R805, a transformer T802 and the like.

The output rectification/filter unit 24 is coupled to the power conversion unit 23 to filter the DC voltage output by the power conversion unit 23 to achieve better DC characteristics and performance. As shown in FIG. 4, the output rectification/filter unit 24 comprises diodes D809, D810, capacitors C817, C822 and the like.

The driving unit 25 is coupled to the power conversion unit 23 to control its power conversion to a higher or lower output DC voltage. As shown in FIG. 4, the driving unit 25 comprises a transistor Q803 and a resistor R11.

The feedback unit 26 is coupled to the output rectification/filter unit 24 to sense the output DC voltage variation. As shown in FIG. 4, the feedback unit 26 comprises an optic coupler I802, resistors R23–R27 and the like.

The power management unit 27 is coupled with the rectification/filter unit 22, the power conversion unit 23, the driving unit 25 and the feedback unit 26 to provide output voltage adjustment, voltage overload protection and output short-circuited protection abilities. As shown in FIG. 4, the power management unit 27 comprises a control IC I801, capacitors C807, C810–C815, a Zener diode ZD801 and the like.

When the AC power is supplied to the linear filter unit 21, the rectification/filter unit 22 outputs a start voltage to the pin 7 of the control IC I801 in the power management unit 27. Next, the power management unit 27 sends a series of impulses through the pin 6 of the control IC I801 to turn on the transistor Q803 in the driving unit 25 in order to further drive the power conversion unit 23 for power conversion. When the pin 3 of the control IC I801 finds that the current passing through the driving unit 25 is too high, the power management unit 27 does not output the impulses to the driving unit 25 to protect the power conversion unit 23 and the driving unit 25 from damage.

DC voltage output by the output rectification/filter unit 24 increasing smoothly is sensed by the optic coupler I802 in the feedback unit 26 through the response of an increasing current. The increasing current causes pin 3 of the optic coupler I802 to output an increasing voltage to the pin 2 of the control IC I801 so that the output width of the impulses becomes narrower to pull down the DC voltage output by the power conversion unit 23. The output of the pull-down DC voltage thus presents a steady status, approximately linear. Therefore, adjustment of the output voltage is achieved. Additionally, when the DC voltage output by the output rectification/filter unit 24 increases sharply, the power conversion unit 23 outputs a sensing voltage over a breakdown voltage of the Zener diode ZD801 to pin 3 of the control IC I801 to detect the voltage variation. As soon as the control IC I801 finds that the response current has risen sharply, the power management unit 27 does not output the impulses to the driving unit 25 to protect the power conversion unit 23 and the driving unit 25 from damage.

When the output of the output rectification/filter is short-circuited, the optic coupler I802 in the feedback 26 cannot detect the response current and the transistor Q806 is cut off so that the control IC I801 does not work to provide the impulses to the driving unit 25 and the power conversion unit 23 does not work, thereby preventing the entire device from damage.

Accordingly, the LCD with power conversion capability according to the invention is characterized by:
(1) The LCD and its built-in power conversion module saving operating space as desired.
(2) The built-in power conversion module providing stable DC conversion efficiency to the LCD in use, effectively raising the overall reliability of the LCD.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An LCD with power conversion capability comprising:
a built-in power conversion module to convert AC input into DC operating voltage for the LCD, wherein the power conversion module comprises:
a rectification/filter unit, to convert the AC input into a ripple DC voltage;
a power conversion unit coupled to the rectification/filter unit, to convert the ripple DC voltage into DC operating voltage for a main board in the LCD;
an output rectification/filter unit coupled to the power conversion unit, to filter the DC operating voltage;
a driving unit coupled to the power conversion unit, to control the power conversion unit for conversion of the AC input to DC operating voltage;
a feedback unit coupled to the output rectification/filter unit, to detect the DC operating voltage variation from the output rectification/filter unit; and
a power management unit coupled between the driving unit and the feedback unit, to receive a start voltage output by the rectification/filter unit, output a series of impulses to the driving unit for operation and adjust the impulses' width according to the variation of the DC operating voltage detected by the feedback unit; and
wherein an output terminal of the built-in power conversion module is coupled to the main board in the LCD using a power output bus.

2. The LCD of claim 1, further comprising a linear filter unit prior to the rectification/filter unit to filter the AC input, thereby reducing electromagnetic interference.

3. The LCD of claim 1, wherein the power management unit receives a sensing voltage output by the power conversion unit when the DC operating voltage raises sharply and thus does not output the impulses.

4. A power conversion module for an LCD with power conversion capability, comprising:
a rectification/filter unit to convert the AC input into a ripple DC voltage;
a power conversion unit coupled to the rectification/filter unit, to convert the ripple DC voltage into a DC operating voltage for supplying a main board in said LCD;
an output rectification/filter unit coupled to the power conversion unit, to filter the DC operating voltage;
a driving unit coupled to the power conversion unit, to control the power conversion unit for conversion of the AC input to the DC operating voltage;
a feedback unit coupled to the output rectification/filter unit, to detect the DC operating voltage variation from the output rectification/filter unit; and a power management unit coupled between the driving unit and the feedback unit, to receive a start voltage output by the rectification/filter unit, output a series of impulses to the driving unit for operation and adjust the impulses' width according to the variation of the DC operating voltage detected by the feedback unit.

5. The power conversion module of claim 4, further comprising a linear filter unit prior to the rectification/filter unit to filter the AC input, thereby reducing electromagnetic interference.

6. The power conversion module of claim 4, wherein the power management unit receives a sensing voltage output by the power conversion unit when the DC operating voltage raises sharply and thus does not output the impulses.

* * * * *